United States Patent [19]

Nathenson

[11] 4,303,842
[45] Dec. 1, 1981

[54] HYDROGENERATOR WITH AN INTERNALLY COOLED ROTOR WINDING OF SALIENT POLE CONSTRUCTION

[75] Inventor: Richard D. Nathenson, Squirrel Hill, Pa.

[73] Assignee: Westinghouse Electric Corp., Pittsburgh, Pa.

[21] Appl. No.: 77,814

[22] Filed: Sep. 21, 1979

[51] Int. Cl.³ .............................................. H02K 9/00
[52] U.S. Cl. .................................. 310/64; 310/60 A; 310/71; 310/201; 310/269
[58] Field of Search ....................... 310/64, 65, 61, 54, 310/58, 269, 198, 201, 202, 207, 208, 60 R, 60 A, 71

[56] References Cited

U.S. PATENT DOCUMENTS

| | | | |
|---|---|---|---|
| 3,075,104 | 1/1963 | Willyoung | 310/54 |
| 3,497,737 | 2/1970 | Philofsky | 310/54 |

FOREIGN PATENT DOCUMENTS

| | | | |
|---|---|---|---|
| 983985 | 2/1976 | Canada | 310/269 |
| 2717058 | 10/1978 | Fed. Rep. of Germany | 310/269 |
| 1254111 | 11/1971 | United Kingdom | 310/64 |

OTHER PUBLICATIONS

Brown Boveri Review, 5/64, vol. 51, No. 5, Baden, Switzerland.

Primary Examiner—R. Skudy
Attorney, Agent, or Firm—G. H. Telfer

[57] ABSTRACT

A new and improved winding and pole construction is provided for a hydrogenerator field coil, comprising: a pole cap, and a winding having concentric inner and outer helices of conductor. The conductor has a central bore extending its length, whereby coolant is circulated therethrough. Each helix comprises a plurality of turns of concentric layers of conductor, bottom lead-outs and top lead-outs. The inner helix may be connected hydraulically in parallel and electrically in series to the outer helix. In one embodiment of the invention, the top lead-outs of the inner helix are accessed through an access port cut in the top of the pole cap. In this embodiment, a portion of each turn is skewed one conductor thickness so that the lead-outs may be proximate the access port with a minimum of available winding cross-sectional area not used. In an alternate embodiment, the access port is located in the rotor rim with a portion of each turn skewed by one conductor thickness toward the rim. This winding, and method for winding the pole, permits efficient cooling of winding conductors while at the same time achieves efficient use of available winding area.

10 Claims, 7 Drawing Figures

HYDROGENERATOR WITH AN INTERNALLY COOLED ROTOR WINDING OF SALIENT POLE CONSTRUCTION

BACKGROUND OF THE INVENTION

1. Field of the Invention

This invention relates to an internally cooled rotor winding for a dynamoelectric machine, and more particularly to a salient pole rotor winding for a hydrogenerator.

2. Description of the Prior Art

The economics of power generation in recent years has called for a reconsideration of the design of generators in order to meet higher operating parameters and efficiencies.

Large hydrogenerators are typically of a salient pole rotor construction. The pole winding comprises helically wound conductors. During operation of the machine the conductors must be cooled. Two types of cooling systems in wide use are forced air ventilation and liquid cooling. In liquid cooling systems, the conductors are cooled by circulating a coolant liquid through either a duct within the main ground insulation or a bore within the conductor itself. This method of cooling improves the heat transfer efficiencies of the machine, and is therefore preferred in large hydrogenerators over other types of cooling such as forced air cooling.

Forced air ventilation systems had at least two drawbacks. First, the air was circulated between the salient poles, in what is called the interpolar space; so the heat transfer requirements, as well as the electromagnetic properties, of the machine dictated the minimal dimensions of this space. Second, electrical insulation around the conductor acted as a thermal barrier and decreased heat removal capability.

The utilization of internally cooled conductors obtains the following benefits: the interpolar space can be reduced in size, with the resultant increased space for conductor packing; the enlarged copper cross-section reduces excitation losses by lowering current density; and the circulated water requires less pumping power than does air, and yet is a more efficient coolant.

A problem with internally cooled salient pole rotors is access to the lead-outs of the conductors. Frequently, hydrogenerators are installed in a vertical manner, that is, with the generator above a turbine. If the ends of the conductors are brought out on opposite sides of the rotor, hydraulic interconnection would have to be made, for example, by running piping through the rotor shaft to reach the leadouts on the side of the rotor facing the turbine. This may prove difficult due to the proximity of other machine structures. Also, this may present repair and maintenance difficulties. Desirable, therefore, is the design of a winding in which all leadouts are on the same side of the rotor; the opposite side from the one facing the turbine. Also desirable would be a design that permits all lead-outs to be clamped together at the interconnection, thereby increasing their mechanical strength.

In the design of a pole winding having the lead-outs on the same side of the rotor, three design trade-offs must be kept in mind. These considerations are: (1) the arrangement of the winding to achieve access to all the conductors of a multi-layered winding; (2) the manufacturing difficulties in fabricating and bending conductors into a helix without distorting the geometry of the conductor, or the bore in the bend region; and (3) the optimum utilization of the pole cross-sectional area for conductor packing.

Conductor packing is important because the more efficiently the available winding area is utilized, the more conductor can be wound around the shank of a pole of given dimensions. A rotor's ratings can be increased by increasing the efficiency of the conductor packing around a pole.

The conventional conductor geometry is generally rectangular in cross-section of large aspect ratio, for example having dimensions of approximately one-quarter inch by four inches in width. Thus the conductor is "strap" or "sheet" shaped. In machines having direct coolant systems the conductors may have a bore centrally located. The conductors may be formed into a helix by bending the hollow conductor edgewise along their wider dimension. This bending may distort the cross-sectional area and the bore's shape. In lieu of bending and to preserve the integrity of the geometry, the dynamoelectric machine's helixes of conductor have previously been formed by brazing a multiplicity of short lengths of conductor together. The brazed joints on occasion may lead to leakage problems when this method is used for internally cooled machines.

In a conventional salient pole, the wrapping of a helical winding around the shank of the pole necessitates the use of conductors having large aspect ratios in order to minimize vacant, unused space which is available for winding. As the thickness of the conductor's narrower dimension increases the amount of unused available winding area also increases. One reason this occurs is that in a known winding arrangement the ends of the helical winding proceed only part way around the pole shank so that they may be interconnected at a predetermined location about the pole. The thicker the conductor's narrower dimension, in such a winding arrangement, the more available space is left unused, and the lower the conductor packing efficiency.

SUMMARY OF THE INVENTION

In the present invention, a new and improved rotor winding and pole construction utilizes available space for conductor packing around the pole more efficiently and permits utilization of an efficient coolant system for the winding. A large hydrogenerator with a more efficient conductor packing and cooling system can operate at higher ratings.

A salient pole of a hydrogenerator's rotor, constructed in accordance with the invention, comprises a pole cap and a winding having concentric inner and outer helices of conductor. The conductor has a central bore, extending the length of the conductor, whereby coolant is circulated therethrough.

Each helix comprises a plurality of turns of concentric layers of conductors, bottom lead-outs, and top lead-outs. The inner helix can be connected hydraulically in parallel ad electrically in series to the outer helix. Each layer within a single helix comprises a predetermined number of helical turns of conductor.

An important feature of one embodiment of the invention is the access port or cut-out in the pole cap directly above the helical windings. The access port is located on the side of the rotor on which both the top and bottom lead-outs are likewise located. The port provides access to the interconnections made between the inner helix and the outer helix as well as permitting the inner helix lead-outs to be brought out of the pole.

The pole, to use a convenient nomenclature, has a multiplicity of radial levels. A radial level is the name herein utilized to describe the location of each turn in the windings. Each radial level is one conductor thickness from the next radial level. In this embodiment, the bottom turn of the winding, i.e., the turn closest the rotor shaft, is on the first radial level, except for a portion of this bottom turn, the width of the lead-outs, which occupies part of the second radial level. Each successive turn is likewise skewed. On the last radial level are the top lead-outs. Substantially no portion of the helical turns lies on this level, except for the top lead-outs. The access port in the pole cap lies on this level. Thus, a highly dense packing of a multi-layered winding is achieved without sacrificing ready access to any of the lead-outs, even those of the inner layers.

In an alternate embodiment, the access port is in the rim of the rotor instead of in the pole cap. The helical turns are skewed towards the rotor shaft, so that the bottom lead-outs are located one radial level below the bottom-most helical turn. The bottom lead-outs are thus disposed proximate to the access port in the rotor rim.

BRIEF DESCRIPTION OF THE DRAWINGS

The objects and advantages of this invention will become more apparent from reading the following detailed description in connection with the accompanying drawings in which.

DESCRIPTION OF THE PREFERRED EMBODIMENT

Figure 1:
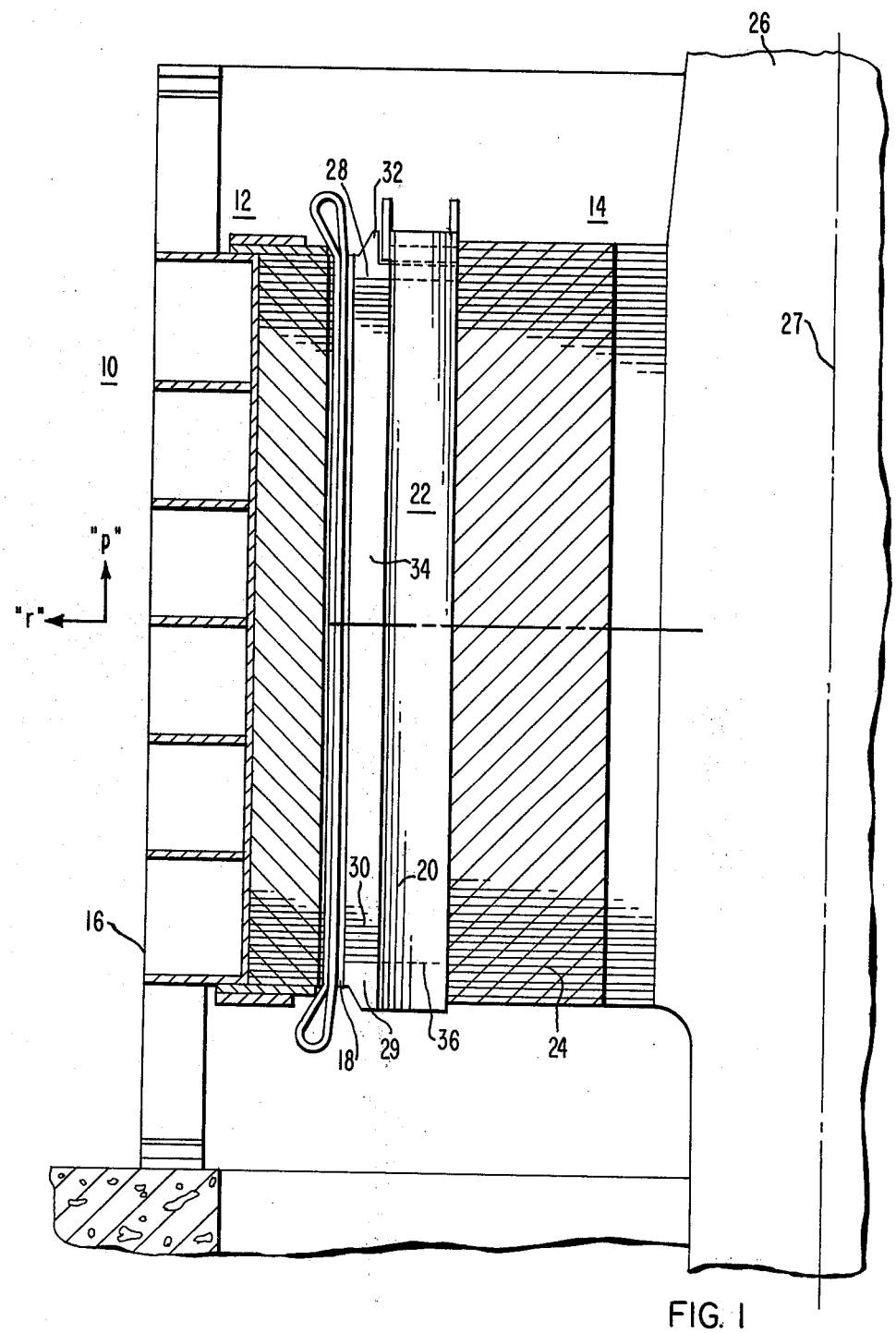
FIG. 1 is a partial view in cross-section of a conventional hydrogenerator employing one embodiment of the invention.

Referring to the drawings, FIG. 1 is a partial view in cross-section of a hydrogenerator 10 wound in accordance with the invention. A hydrogenerator 10 comprises a stator 12 and a rotor 14 housed within a frame 16. The stator 12 is separated from the rotatably mounted rotor 14 by an air gap 18. The rotor 14 includes a rotor winding 20 wound around a plurality of poles 22; a rotor rim 24, constructed for example of ring-shaped laminations; and a rotor shaft 26.

FIG. 1 shows one pole 22 of the many that comprise the rotor. The pole 22 in cross-section is of a generally "mushroom-like" shape. It is comprised of two pole caps 28 and 29, one at each end of the pole, and separated from one another by the punchings 30. The punchings 30 are generally constructed of laminations of iron. The pole caps 28 and 29 perform two functions. First they provides solid anchor for bolting the laminations of the punchings 30 together; and second they prevent the ends of the winding 20 from mechanically slipping on the pole 22 due to centrifugal force resulting from the rotation of the rotor 14. To achieve the latter objective, the pole 22 is designed with two lips 32 or flareouts on opposite sides of its top 34, one lip 32 in each of its pole caps 28 and 29. The top 34 of the pole 22 is that portion radially the farthest from the shaft 26 of the rotor 14. The direction radially outward from the center line of the rotor, to the pole cap 28 is indicated by the arrow "r" and is so referenced in the drawings. The lips 32 protrude outward from the center line of the individual salient poles 22 parallel to centerline 27. This direction is indicated by the arrow "p". The winding 20 is wrapped around the pole 22 beneath the pole top 34. The portion of the pole 22 around which it is wound is called the shank 36. The length of the lip 32 in the "p" direction along with the geometry of the shank 36 determines the available area for the winding 20. This is one of the parameters that dictates the size and number of conductors in the winding 20. Other determinative parameters are the operating ratings of the machine; especially in light of the heat removal requirements.

The distance between poles, i.e., between one pole's lip to the next pole's lip is called the interpolar space. In traditional designs, gas coolant is circulated in this space. In accordance with this invention a generator is constructed of hollow conductors in which liquid coolant is circulated. The interpolar spaces need not be as large as in other generators using a cooling system such as forced air ventilation. This makes available more space around the pole for the winding conductors.

Figure 2:
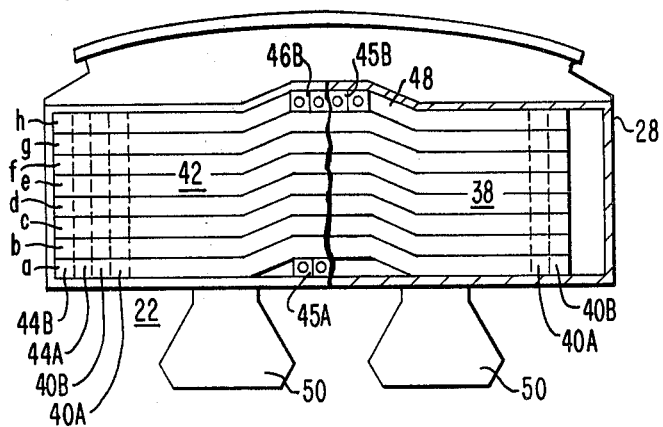
FIG. 2 is a front view, part broken away, showing a pole wound in accordance with the invention.
Figure 3:
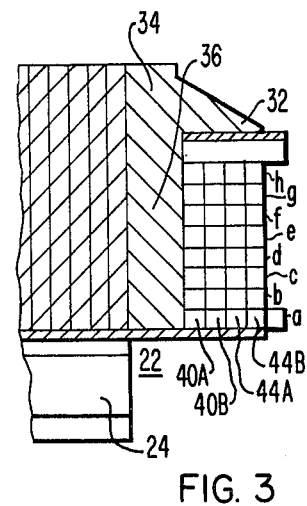
FIG. 3 is a partial side view of the assembled pole of FIG. 2.
Figure 4:
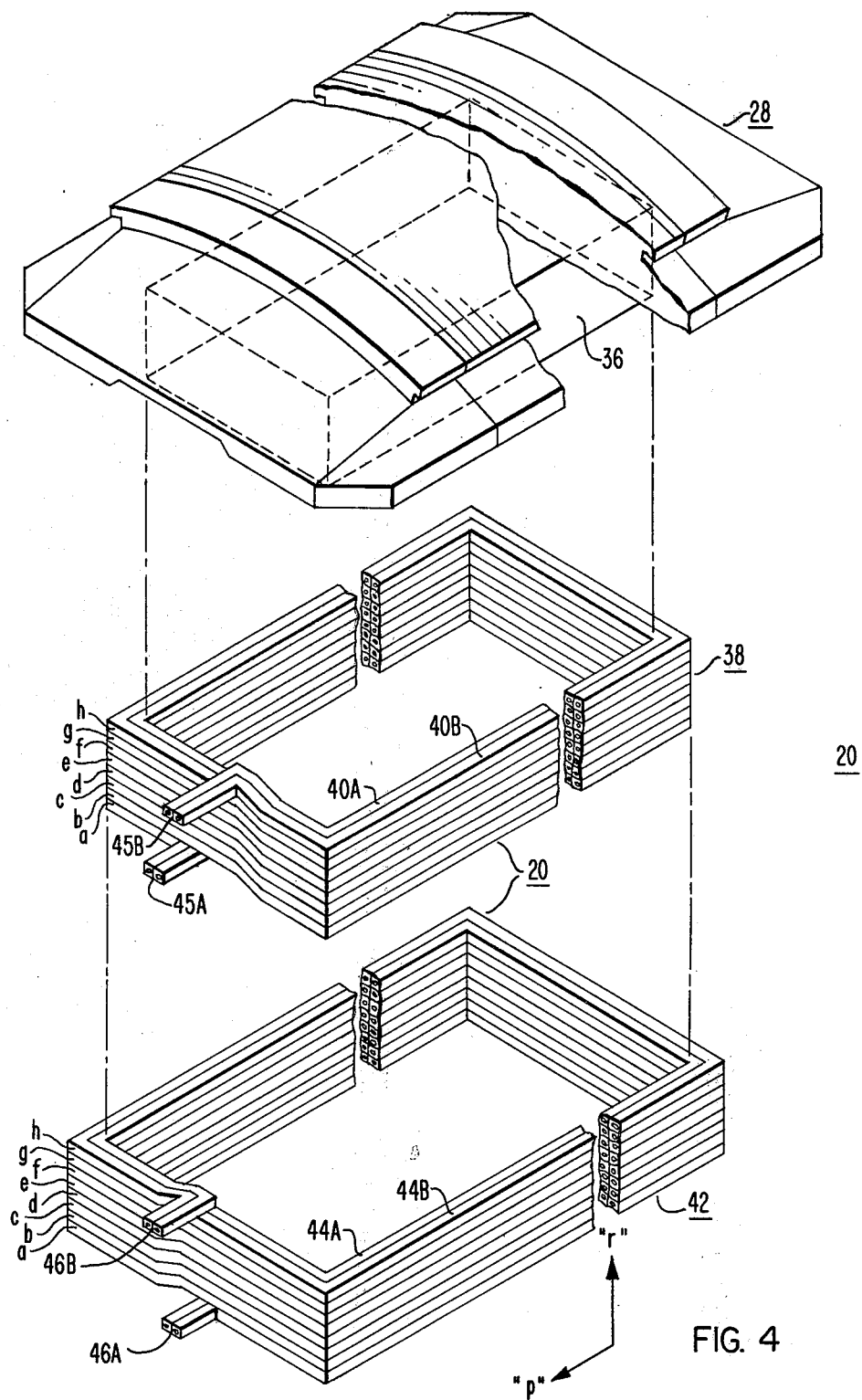
FIG. 4 is an exploded perspective view of a pole and winding in accordance with the invention.

FIGS. 2, 3 and 4 depict an individual pole 22 wound in accordance with the invention. FIG. 2 is a front view with a cut-away of an assembled pole 22 wound in accordance with the invention. FIG. 3 is a partial side view of the same pole 22. FIG. 4 is a representation in perspective of an unassembled pole 22 wound in accordance with the invention.

It can be seen in FIG. 4 that two helices of conductors are concentrically wrappable around a shank 36 of the pole 22. Each of the helices have a predetermined number of groups of turns, each individual turn designated in the drawing by the lower case letters "a" through "h". It should be understood that the number of individual turns in the drawings can be varied by a designer while still employing the invention. Also used for the purposes of illustrating the invention is a multi-layered winding comprising two layers 40A, B in the inner helix 38 and two more layers 44A, B in the outer helix 42. The inner helix 38 is wrapped around the pole shank 36 in the opposite direction from the wrapping of the outer helix 42. In manufacturing a pole 22 in accordance with this invention, it is possible to wrap the inner helix 38 of conductors around the pole shank 36 and then wrap the outer helix 42 around the inner helix 38. It can be seen in the drawings that the turns in the inner helix 38 and the outer helix 42 of the winding 20 are skewed in the "r" direction for a relatively small portion of each turn. To better understand this, it will assist the description to divide the "r" direction into units called "radial levels" equal to the depth of the conductor used in the winding 20. Because a small portion of the bottom turn (turn "a") of each helix is skewed, it falls on both the first (bottommost) radial level and the second radial level. It is important to note that the bottom lead-outs 45A of the inner helix and the bottom lead-outs 46A of the outer helix protrude out on this lowest radial level. The length of the bottom turn (turn "a") which is located on the second radial level is only that length equivalent to the thickness of the lead-outs, i.e., the length sufficient to accommodate the bottom lead-outs 45A, 46A of the inner and outer helices. At the top of the pole shank 36, the winding helices terminate with their top lead-outs 45B, 46B protruding out through the access port 48 cut in the pole cap 28 on one side of the rotor 14.

Returning to FIG. 2, the drawing has a cut-away to the right of the center line. In the cut-away view can be seen the inner helix 38. To the left of the center line can be seen the outer helix 42. Also illustrated are the skewed portion of each turn, and the access port 48 in the pole cap 28. Notice that the width of the skewed portion of each turn is only that which is necessary to accommodate the width of the lead-outs, for example, it is effectively the width of four conductors in a four layer winding. At the bottom of the pole 22 are the dove-tails 50 which fit into slots (not shown) in the rotor rim 24.

FIG. 3 is a partial side view of the pole 22 in FIG. 2 mounted in the rotor rim 24. The two layers 40A, B of the inner helix 38 are shown to be wound around the shank 36 of the pole cap 28. The outer helix 42 with its two layers 44A, B are wrapped around the inner helix 38. The lip 32 of the top 34 of the pole cap 28 extends over the winding in the "p" direction to secure the winding in position. One radial level above the rim, and shown as extending out from the pole 22, are the bottom lead-outs 45A, 46A. Above the last turn (turn "h") by one radial level are shown the top lead-outs 45B and 46B. The lead-outs are shown to be extending from the windings but it should be understood that the lead-outs can be interconnected or can be brought out of the pole 22.

Figure 5:
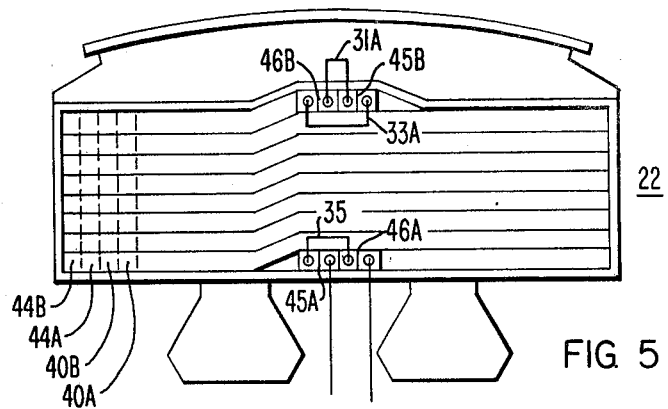
FIG. 5 is a pictorial illustration of the hydraulic interconnections of the winding conductors for a pole wound in accordance with the invention.

FIG. 5 depicts the electrical connections of the lead-outs 45A,B and 46A,B. For this explanation the helices shall be considered to be wound in the directions shown in FIG. 4. It should be understood, however, that the only limitation on the winding direction is that the inner helix (not shown) be wound in the opposite direction to that of the outer helix 42. The top lead-outs are interconnected as follows: (a) the innermost layer 40A of the top lead-out 45B of the inner helix (not shown) is connected electrically by connector 31A to the innermost layer 44A of the top lead-out 46B of the outer helix 42; and (b) the outermost layer 40B of the top lead-out 45B of the inner helix (not shown) is connected by connector 33A to the outermost layer 44B of the top lead-out 45B of outer helix 42. The bottom lead-outs are connected as follows: (c) the outermost layer 40B of the bottom leadout 45A of the inner helix 38 is connected by connector 35 to the innermost layer 44A of the bottom lead-out 46A of the outer helix 42; and (d) the remaining two layers are brought out of the pole 22. This example serves as one illustration of the ways the conductors can be connected, although it should be understood that other combinations of interconnections are possible.

Figure 6:
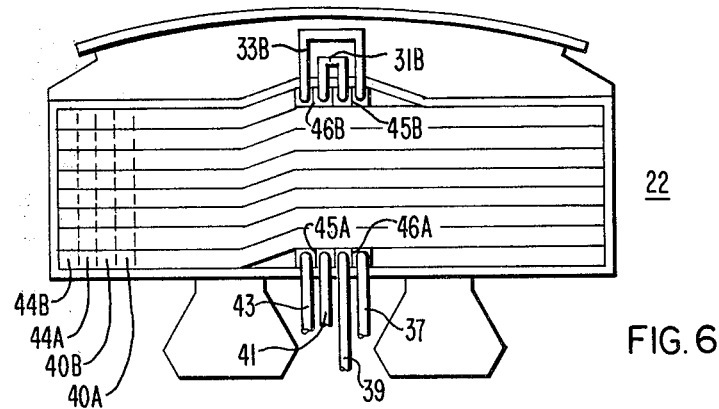
FIG. 6 is a pictorial illustration of the electric interconnections of the winding conductors for a pole wound in accordance with the invention.

FIG. 6 depicts the hydraulic connection of lead-outs for the pole diagrammatically shown in a perspective, exploded view in FIG. 4. The arrows in FIG. 6 indicates one possible direction of fluid flow for the hydraulic paths there shown. The top lead-outs are connected by hydraulic connectors 31B, 33B in the same manner as the electrical connection for the top lead-outs discussed for FIG. 6. In one construction for example the electrical connectors 31A and 33A contain therein means for conducting fluids, such as a bore extending therethrough and serving as the hydraulic connectors 31B, 33B. The bottom lead-outs are connected to an external coolant supply means, for example, as follows: the two layers 44A, B of the bottom lead-out 46A of the outer helix may serve as coolant inlets 37, 39 to the pole 22 while the two layers 40A, B of the bottom lead-out 45A may serve as coolant outlets 41, 43 from the pole 22. This arrangement provides for the cooling of two layers in one hydraulic path. Of course the connections to the coolant supply means could, if desired be made through the access port 48 via the top lead-outs 45B, 46B by reversing the connection just described. It may be further understood that the hydraulic connections could be made to each layer individually thus providing in this example, four parallel hydraulic paths. This would allow a further increase in machine ratings to be obtained from the winding.

ALTERNATE EMBODIMENTS

The invention can be practiced in either of two principal embodiments. In a first of the two embodiments, the access port can be a cut-out in the top of the pole cap. This is depicted in FIGS. 1 through 6 and has already been described. In as second embodiment, the access port can be located beneath the pole in a cut-out in the rotor rim.

Figure 7:
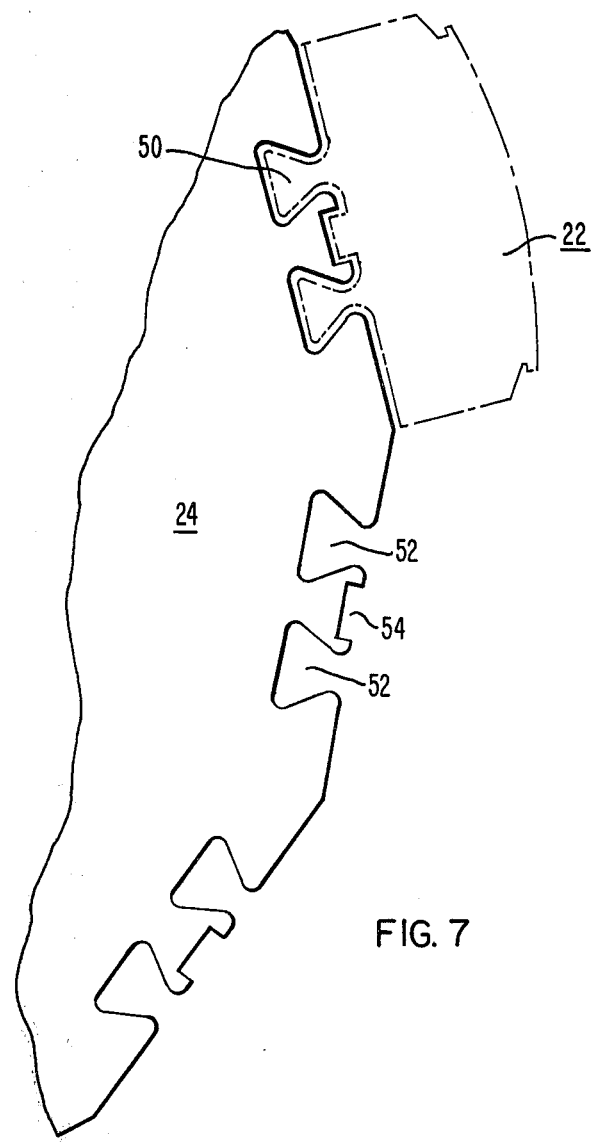
FIG. 7 is a partial perspective view of a rotor rim having an access port in accordance with another embodiment of the invention.

FIG. 7 depicts a rotor rim 24 having the slots 52 which mate with the dove-tails 50 of a pole (not shown). A rim access port 54 is a cut-out located in the area of the rim 24 between the slots 52 and located to be adjacent the pole (not shown) which is mounted in the slots 52. The size of this rim access port 54 is similar to that of the access port 48 in the other embodiment. Its depth for example, into a rim 500 mm thick may approach 100 mm.

In the practice of the invention the conductors may be copper and may have a generally square cross-sectional area with a bore therein. Such a conductor can be extruded with dimensions, for example, of one inch (2.54 cm.) per side. Thus the cross-sectional area of such a conductor is the same as the area of the conventional conductors discussed previously. An advantage of this geometry is that the bending of the conductor in forming a helix is facilitated since previously the typical conductor was bent along its four inch width while now the conductor need be bent through only one inch of metal. This invention permits the use of the more square-shaped conductors because it utilizes, in an efficient manner, that available winding cross-sectional area. In the practice of this invention, and due to the method of winding and the interconnections of lead-outs, very little of the available winding area is unused.

In accordance with one embodiment of the invention, a method of constructing a salient pole for a dynamo-electric machine would include the following steps: First, an inner helix of a plurality of turns is formed from a first group of conductors. This is done by winding the first group in a first direction. This inner helix must be capable of receiving a shank of a pole therethrough. Second, an outer helix of a plurality of turns is formed from a second group of conductors. This is done by winding the second group in the opposite direction from the first direction. The outer helix must be capable of receiving the first group therethrough. Third, a portion of each turn of each helix is skewed by one conductor thickness toward a first and of said helices. Fourth, the helices are assembled on the shank of the pole by placing the inner helix over the shank and placing the outer helix over the inner helix such that the first end of each of said helices is disposed proximate to a pole cap of said pole. And fifth, the appropriate connections and interconnections are made with the first end of the inner helix. They are made through a access port in the pole cap, as has already been discussed. This method may further comprise an initial step of extruding the conductors. The conductors may have a generally square cross-sectional area with a central bore therethrough.

While particular embodiments of the invention has been shown for purpose of illustration, other arrangements and embodiments may be practiced by those skilled in the art without departing from the scope and spirit of the invention. It is not desired, therefore, that the invention be limited to the specific arrangements described herein.

I claim:

1. A salient pole of a liquid cooled rotor for a dynamoelectric machine, said pole including: a pole cap; punchings; a winding, said winding having concentric inner and outer helices of conductor, said helices being wound in mutually opposite directions, said conductor having a central bore extending the length of the conductor, through which coolant is circulated to cool said winding, each of said helices comprises a plurality of concentric layers, each of said layers within a single helix comprises a predetermined number of helical turns of conductor, each of said turns comprising a skewed section, said skewed section extending into an adjacent turn, a bottom lead-out, and a top lead-out; and means for accessing each of said lead-outs, whereby access to the lead-outs of both the inner and outer helix is made possible; said top lead-out of said inner helix being proximate said top lead-out of said outer helix; said bottom lead-out of said inner helix being proximate said bottom lead-out of said outer helix; said top lead-outs being interconnectable; and said bottom lead-outs each being connectable to external fluid connections.

2. The salient pole of claim 1 wherein said accessing means comprises an access port in the top of the pole cap through which said lead-outs can be connected or brought out of the pole.

3. The salient pole of claim 2 wherein said pole includes a multiplicity of radial levels, and wherein said bottom lead-outs and a portion of a bottom turn of each helix is located at a first radial level, and said top lead-outs and no portion of a top turn is located at a last radial level.

4. The salient pole of claim 1 wherein the conductor is of a generally square cross-sectional area having a bore therethrough.

5. The salient pole of claim 1 wherein: the means for accessing the inner helix comprises an access port located within the pole cap; and a portion of each of said turns of each helix is skewed by one conductor thickness toward said access port, whereby said lead-outs of both said inner helix and said outer helix are accessible through said port.

6. The salient pole of claim 5 wherein: said inner helix is connected hydraulically in parallel and electrically in series to said outer helix.

7. The salient pole of claim 1 in combination with a rim of the rotor, and wherein: said means comprises an access port in said rim, and a portion of each of said turns of each helix is skewed by one conductor thickness toward said access port, whereby said lead-outs of said inner helix and said outer helix can be accessed through said port.

8. The salient pole of claim 1 wherein the conductor is extruded conductive material having a generally square cross-sectional area with a central bore therethrough.

9. A hydrogenerator comprising a frame, a cylindrical stator mounted within the frame, and a rotor rotatably mounted within the frame for rotation relative to said stator, said rotor including a plurality of salient poles, said plurality of salient poles being disposed about the periphery of said rotor, each pole comprising: at least one pole cap; a winding; and a shank portion around which said winding is wound; said pole cap having an access port; said winding having a first and a second group, each group comprised of a plurality of turns of at least one helically wound conductor, said conductor of each group having a central bore through which coolant flows during operation of said hydrogenerator and having a top leadout and a bottom leadout; said first group being wound about said shank, in a first direction; said second group being wound about said first group, in the opposite direction from said first direction; said top leadouts of said conductors being disposed proximate to and accessible through said access port; each of said leadout of said first and second group being connectable to another leadout; and each of said leadouts being connectable to external fluid connections.

10. The hydrogenerator of claim 9 wherein each of said turns has a portion which is skewed towards the access port.

* * * * *